United States Patent
Sato et al.

(10) Patent No.: US 8,411,472 B2
(45) Date of Patent: Apr. 2, 2013

(54) POWER CONVERSION DEVICE

(75) Inventors: Eduardo Kazuhide Sato, Minato-ku (JP); Masahiro Kinoshita, Minato-ku (JP); Yushin Yamamoto, Minato-ku (JP); Tatsuaki Amboh, Minato-ku (JP); Yasuhiro Yabunishi, Akashi (JP)

(73) Assignees: Toshiba Mitsubishi-Electric Industrial Systems Corporation, Tokyo (JP); Kobe Electric Industry Inc., Akashi-shi (JP)

( * ) Notice: Subject to any disclaimer, the term of this patent is extended or adjusted under 35 U.S.C. 154(b) by 263 days.

(21) Appl. No.: 13/000,223

(22) PCT Filed: Jul. 30, 2008

(86) PCT No.: PCT/JP2008/063670
§ 371 (c)(1),
(2), (4) Date: Dec. 20, 2010

(87) PCT Pub. No.: WO2010/013323
PCT Pub. Date: Feb. 4, 2010

(65) Prior Publication Data
US 2011/0103106 A1 May 5, 2011

(51) Int. Cl.
*H02J 3/36* (2006.01)
(52) U.S. Cl. ........................................... 363/35
(58) Field of Classification Search ............ 363/35, 363/34, 37, 123
See application file for complete search history.

(56) References Cited

U.S. PATENT DOCUMENTS 5,561,595 A * 10/1996 Smith .................. 363/37
6,169,677 B1 1/2001 Kitahata et al.

FOREIGN PATENT DOCUMENTS

| CN | 1933054 | 3/2007 |
|---|---|---|
| JP | 62 7373 | 1/1987 |
| JP | 63-156539 U | 10/1988 |
| JP | 3-38807 | 2/1991 |
| JP | 5 205956 | 8/1993 |
| JP | 7 130557 | 5/1995 |
| JP | 9 294381 | 11/1997 |
| JP | 10-23668 A | 1/1998 |
| JP | 2000 152637 | 5/2000 |

OTHER PUBLICATIONS

International Search Report issued Oct. 21, 2008 in PCT/JP08/63670 filed Jul. 30, 2008.
U.S. Appl. No. 13/498,009, filed Mar. 23, 2012, Sato, et al.
U.S. Appl. No. 13/498,515, filed Mar. 27, 2012, Sato, et al.
Office Action issued May 24, 2012 in Korean Patent Application No. 10-2011-7001738 (with English translation).

(Continued)

*Primary Examiner* — Shawn Riley
(74) *Attorney, Agent, or Firm* — Oblon, Spivak, McClelland, Maier & Neustadt, L.L.P.

(57) ABSTRACT

In a power conversion device, reactors in an AC input filter absorbing a voltage at a carrier frequency of a PWM converter and reactors in an AC output filter absorbing a voltage at a carrier frequency of a PWM inverter include one six-leg six-phase iron core reactor. Accordingly, the device can be reduced in size when compared with a case where the reactors are composed of two four-leg six-phase iron core reactors.

3 Claims, 6 Drawing Sheets

OTHER PUBLICATIONS

Pit-Leong Wong, "Performance Improvements of Multi-Channel Interleaving Voltage Regulator Modules with Integrated Coupling Inductors", (Dissertation Submitted to the Faculty of the Virginia Polytechnic Institute and State University in Partial Fulfillment of the Requirements for the Degree of Doctor of Philosophy in Electrical Engineering) Mar. 28, 2001, 223 pages.

Chinese Office Action with English translation mailed Dec. 17, 2012, in Chinese Patent Application No. 2008-80130656.8.

* cited by examiner

POWER CONVERSION DEVICE

TECHNICAL FIELD

The present invention relates to a power conversion device, and in particular to a power conversion device including a Pulse Width Modulation (PWM) converter and a PWM inverter.

BACKGROUND ART

Conventionally, a power conversion device converting a three-phase alternating current (AC) voltage from a three-phase AC power source into a direct current (DC) voltage by a PWM converter, converting the DC voltage into a three-phase AC voltage by a PWM inverter, and supplying the three-phase AC voltage to a load circuit has been put to practical use. In the power conversion device, in order to prevent a voltage at a carrier frequency generated by switching transistors in the PWM converter from flowing into the three-phase AC power source, an AC input filter is provided between the three-phase AC power source and the PWM converter. The AC input filter includes three reactors and three capacitors.

In addition, in order to prevent a voltage at a carrier frequency generated by switching transistors in the PWM inverter from flowing into the load circuit, an AC output filter is provided between the PWM inverter and the load circuit. The AC output filter includes three reactors and three capacitors (for example, see Japanese Patent Laying-Open No. 9-294381 (Patent Document 1)).

Patent Document 1: Japanese Patent Laying-Open No. 9-294381

DISCLOSURE OF THE INVENTION

Problems to be Solved by the Invention

When the sum of three-phase AC currents is zero, the sum of magnetic fluxes due to the three-phase AC currents is also zero, and thus the three reactors of each of the AC input filter and the AC output filter can be composed of a three-leg three-phase iron core reactor having three main legs. However, when the sum of three-phase AC currents is not zero, and a magnetic flux due to a current of the sum of the three-phase AC currents (referred to as a zero phase current) is generated, magnetic fluxes within the main legs of the three-leg three-phase iron core reactor are saturated (see FIG. 3).

In order to prevent the magnetic fluxes within the main legs from being saturated by the magnetic flux due to the zero phase current, a four-leg three-phase iron core reactor having three main legs and one return path leg can be used (see FIG. 4). However, using two four-leg three-phase iron core reactors results in larger device dimensions.

Therefore, one main object of the present invention is to provide a small-sized power conversion device.

Means for Solving the Problems

A power conversion device in accordance with the present invention includes a PWM converter converting a first three-phase AC voltage to a DC voltage, a PWM inverter converting the DC voltage to a second three-phase AC voltage, an AC input filter transmitting the first three-phase AC voltage and blocking a voltage at a carrier frequency generated in the PWM converter, and an AC output filter transmitting the second three-phase AC voltage and blocking a voltage at a carrier frequency generated in the PWM inverter. The AC input filter includes first to third reactors having one terminals receiving the first three-phase AC voltage and other terminals connected to the PWM converter, and first to third capacitors having one electrodes connected to the one terminals of the first to third reactors, respectively. The AC output filter includes fourth to sixth reactors having one terminals receiving the second three-phase AC voltage and other terminals connected to a load circuit, and fourth to sixth capacitors having one electrodes connected to the other terminals of the fourth to sixth reactors, respectively. Other electrodes of the first to sixth capacitors are connected in common. The first to sixth reactors are composed of a six-leg six-phase iron core reactor or a seven-leg six-phase iron core reactor.

Effects of the Invention

In the power conversion device in accordance with the present invention, the first to third reactors of the AC input filter and the fourth and sixth reactors of the AC output filter are composed of a six-leg six-phase iron core reactor or a seven-leg six-phase iron core reactor. Accordingly, the device can be reduced in size when compared with the case of using two four-leg three-phase iron core reactors.

DESCRIPTION OF THE REFERENCE SIGNS

1: AC input filter, 2 to 4, 11, 19 to 21, 62, 63: capacitor, 5 to 7, 16 to 18: reactor, 8: PWM converter, 9, 14: diode, 10, 13: transistor, 12: PWM inverter, 15: AC output filter, 22: three-phase AC power source, 23: load circuit, 30: six-leg six-phase iron core reactor, 31 to 36, 51 to 53: main leg, 37, 38: yoke, 41 to 46: wound wire, 50: three-leg three-phase iron core reactor, 54: four-leg three-phase iron core reactor, 55, 61: return path leg, 60: seven-leg six-phase iron core reactor, 65: DC power source, a1, b1, c1, a11, b11, c11: one terminal, a2, b2, c2, a22, b22, c22: the other terminal, T1 to T3: input terminal, T4 to T6: output terminal.

BEST MODES FOR CARRYING OUT THE INVENTION

Figure 1:
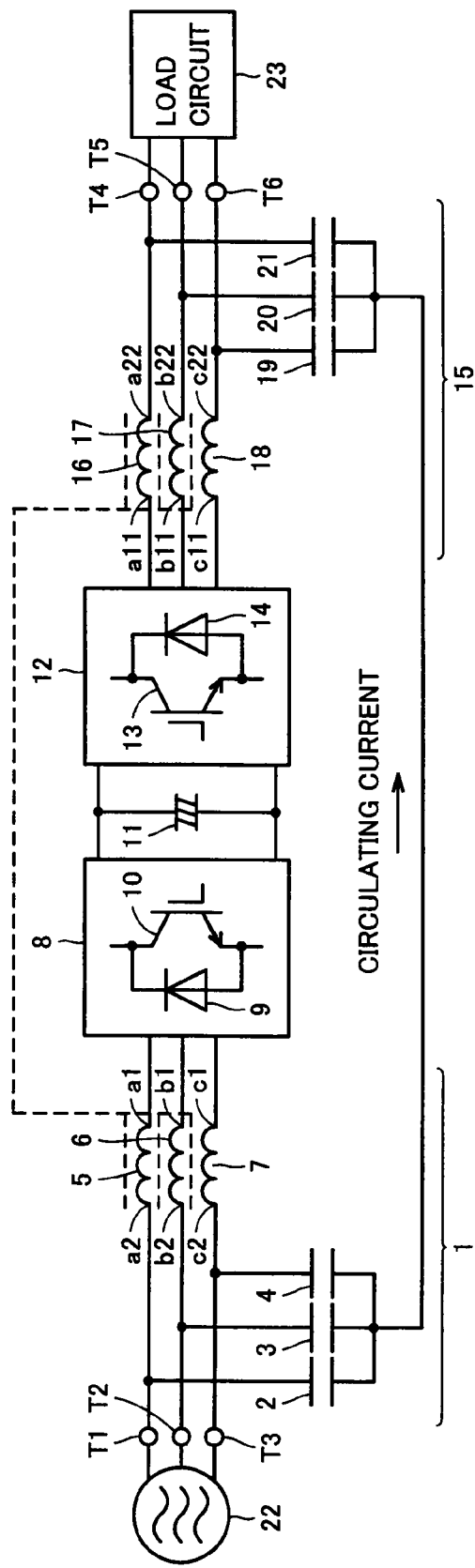
FIG. 1 is a circuit block diagram showing a configuration of a power conversion device in accordance with one embodiment of the present invention.

FIG. 1 is a circuit block diagram showing a configuration of a power conversion device in accordance with one embodiment of the present invention. In FIG. 1, the power conversion device includes input terminals T1 to T3, an AC input filter 1, a PWM converter 8, a capacitor 11, a PWM inverter 12, an AC output filter 15, and output terminals T4 to T6. Input terminals T1 to T3 receive a three-phase AC voltage from a three-phase AC power source 22.

AC input filter 1 includes capacitors 2 to 4 and reactors 5 to 7. Capacitors 2 to 4 have one electrodes connected to input terminals T1 to T3, respectively, and the other electrodes connected to each other. Reactors 5 to 7 have one terminals a1 to c1 connected to three input terminals of PWM converter 8, and the other terminals a2 to c2 connected to input terminals T1 to T3, respectively.

AC input filter 1 is a low-pass filter allowing a signal at a frequency of the three-phase AC voltage (for example, 60 Hz) to pass therethrough, and blocking a signal at a carrier frequency generated in PWM converter 8 (for example, 10 kHz). Therefore, the three-phase AC voltage is transmitted from three-phase AC power source 22 to PWM converter 8 via AC input filter 1, and a voltage at the carrier frequency generated in PWM converter 8 is blocked by AC input filter 1. Thereby, three-phase AC power source 22 is prevented from being affected by the voltage at the carrier frequency generated in PWM converter 8.

PWM converter 8 is a well-known converter including a plurality of sets of diodes 9 and transistors 10, and converts the three-phase AC voltage supplied from three-phase AC power source 22 via AC input filter 1 into a DC voltage. Each of the plurality of transistors 10 in PWM converter 8 is PWM controlled at the carrier frequency, and keeps the DC output voltage constant while keeping an input current sinusoidal and keeping an input power factor at 1. The voltage at the carrier frequency described above is generated at the three input terminals of PWM converter 8 in accordance with switching of the plurality of transistors 10. Capacitor 11 is connected between a pair of output terminals of PWM converter 8, and is charged to the constant DC voltage by PWM converter 8.

PWM inverter 12 is a well-known inverter including a plurality of sets of transistors 13 and diodes 14, and converts the DC voltage generated by PWM converter 8 into a three-phase AC voltage. Each of the plurality of transistors 13 in PWM inverter 12 is PWM controlled at a carrier frequency (for example, 10 kHz) higher than a frequency of the three-phase AC voltage (for example, 60 Hz), and keeps the output voltage to be a constant sinusoidal voltage. Also in PWM inverter 12, a voltage at the carrier frequency is generated at three output terminals of PWM inverter 12 in accordance with switching of the plurality of transistors 13.

AC output filter 15 includes reactors 16 to 18 and capacitors 19 to 21. Reactors 16 to 18 have one terminals a11 to c11 connected to the three output terminals of PWM inverter 12, and the other terminals a22 to c22 connected to output terminals T4 to T6, respectively. Output terminals T4 to T6 are connected to a load circuit (for example, a three-phase AC motor) 23. Capacitors 19 to 21 have one electrodes connected to output terminals T4 to T6, respectively, and the other electrodes connected to each other and further connected to the other electrodes of capacitors 2 to 4.

AC output filter 15 is a low-pass filter allowing a signal at the frequency of the three-phase AC voltage to pass therethrough, and blocking a signal at the carrier frequency generated in PWM inverter 12. Therefore, the three-phase AC voltage is transmitted from PWM inverter 12 to load circuit 23 via AC output filter 15, and the voltage at the carrier frequency generated in PWM inverter 12 is blocked by AC output filter 15. Thereby, load circuit 23 is prevented from being affected by the voltage at the carrier frequency generated in PWM inverter 12.

Figure 2:
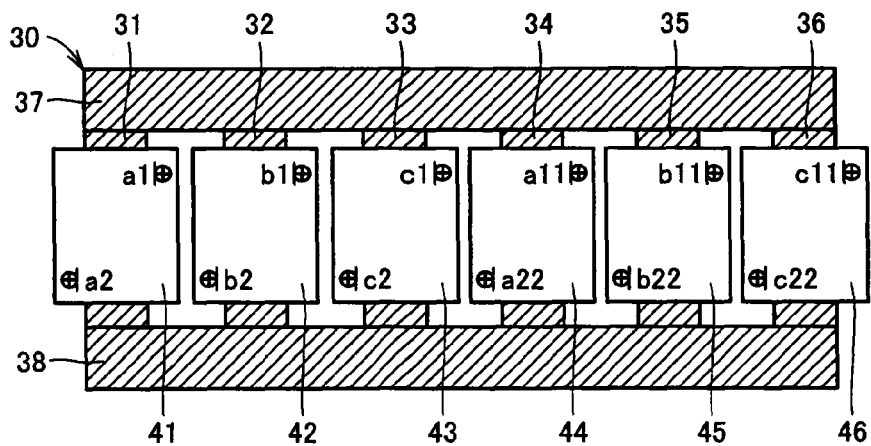
FIG. 2 is a view showing a configuration of a six-leg six-phase iron core reactor used in the power conversion device shown in FIG. 1.

The power conversion device is characterized in that reactors 5 to 7 in AC input filter 1 and reactors 16 to 18 in AC output filter 15 are composed of one six-leg six-phase iron core reactor. As shown in FIG. 2, a six-leg six-phase iron core reactor 30 includes six main legs 31 to 36, two yokes 37, 38, and six wound wires 41 to 46.

Main legs 31 to 36 are arranged in parallel at a predetermined interval. Upper end portions of main legs 31 to 36 are magnetically coupled by yoke 37, and lower end portions thereof are magnetically coupled by yoke 38. Wound wires 41 to 46 are wound around main legs 31 to 36, respectively, in an identical direction. One terminals a1, b1, c1, a11, b11, c11 of reactors 5 to 7, 16 to 18 are connected to winding start side terminals of wound wires 41 to 46, respectively. In addition, the other terminals a2, b2, c2, a22, b22, c22 of reactors 5 to 7, 16 to 18 are connected to winding end side terminals of wound wires 41 to 46, respectively.

Ideally, at each of an input side and an output side of a power conversion device with a configuration as shown in FIG. 1, the sum of vectors of three-phase currents is zero. Actually, however, the sum is not zero, and a circulating current (zero phase current) flows through a loop composed of AC input filter 1, AC output filter 15, PWM inverter 12, and PWM converter 8.

Figure 3:
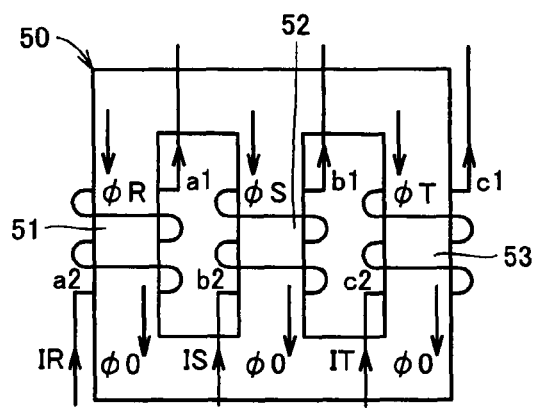
FIG. 3 is a view for explaining the effect of the embodiment.

If reactors 5 to 7 are composed of a three-leg three-phase iron core reactor 50 as shown in FIG. 3, when three-phase currents IR, IS, IT flow through reactors 5 to 7, three-phase magnetic fluxes $\phi R$, $\phi S$, $\phi T$ are generated in three main legs 51 to 53, respectively, and a magnetic flux $\phi 0$ due to the zero phase current is generated in each of main legs 51 to 53. Therefore, the sum of the magnetic fluxes in main legs 51 to 53 is not zero, and the magnetic fluxes are saturated within main legs 51 to 53. Saturation of the magnetic fluxes lead to deterioration in characteristics of reactors 5 to 7, and deterioration in characteristics of AC input filter 1. The same problem occurs when reactors 16 to 18 are composed of a three-leg three-phase iron core reactor.

Figure 4:
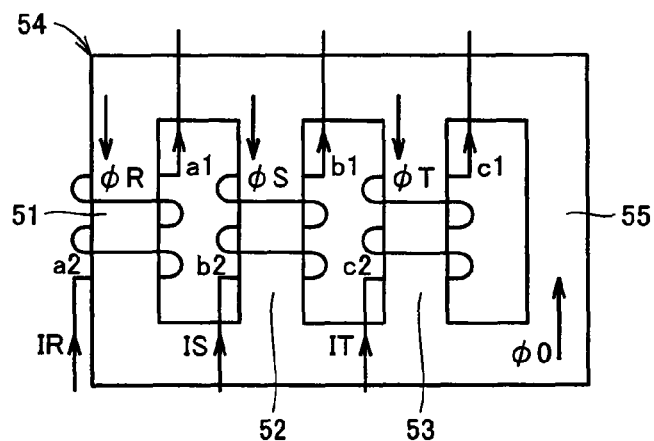
FIG. 4 is another view for explaining the effect of the embodiment.

If reactors 5 to 7 are composed of a four-leg three-phase iron core reactor 54 as shown in FIG. 4, even if magnetic flux $\phi 0$ due to the zero phase current is generated, a loop allowing magnetic flux $\phi 0$ to pass therethrough is composed of main legs 51 to 53 and a return path leg 55, and thus magnetic fluxes are not saturated within main legs 51 to 53. However, when reactors 5 to 7, 16 to 18 are composed of two four-leg three-phase iron core reactors 54, there arises a problem that device dimensions are increased.

In contrast, in the present invention, reactors 5 to 7, 16 to 18 are composed of six-leg six-phase iron core reactor 30. Therefore, even if three-phase currents IR, IS, IT flow through reactors 5 to 7 to generate three-phase magnetic fluxes $\phi R$, $\phi S$, $\phi T$ in three main legs 31 to 33, respectively, and magnetic flux $\phi 0$ due to the zero phase current is generated in main legs 31 to 33 as shown in FIG. 5(a), a loop allowing magnetic flux $\phi 0$ to pass therethrough is composed of main legs 31 to 33 and main legs 34 to 36, and thus the magnetic fluxes are not saturated within main legs 31 to 33.

Further, even if three-phase currents IU, IV, IW flow through reactors 16 to 18 to generate three-phase magnetic fluxes $\phi U$, $\phi V$, $\phi W$ in three main legs 34 to 36, respectively, and magnetic flux $\phi 0$ due to the zero phase current is generated in main legs 34 to 36 as shown in FIG. 5(b), a loop allowing magnetic flux $\phi 0$ to pass therethrough is composed of main legs 34 to 36 and main legs 31 to 33, and thus the magnetic fluxes are not saturated within main legs 51 to 53.

Figure 5:
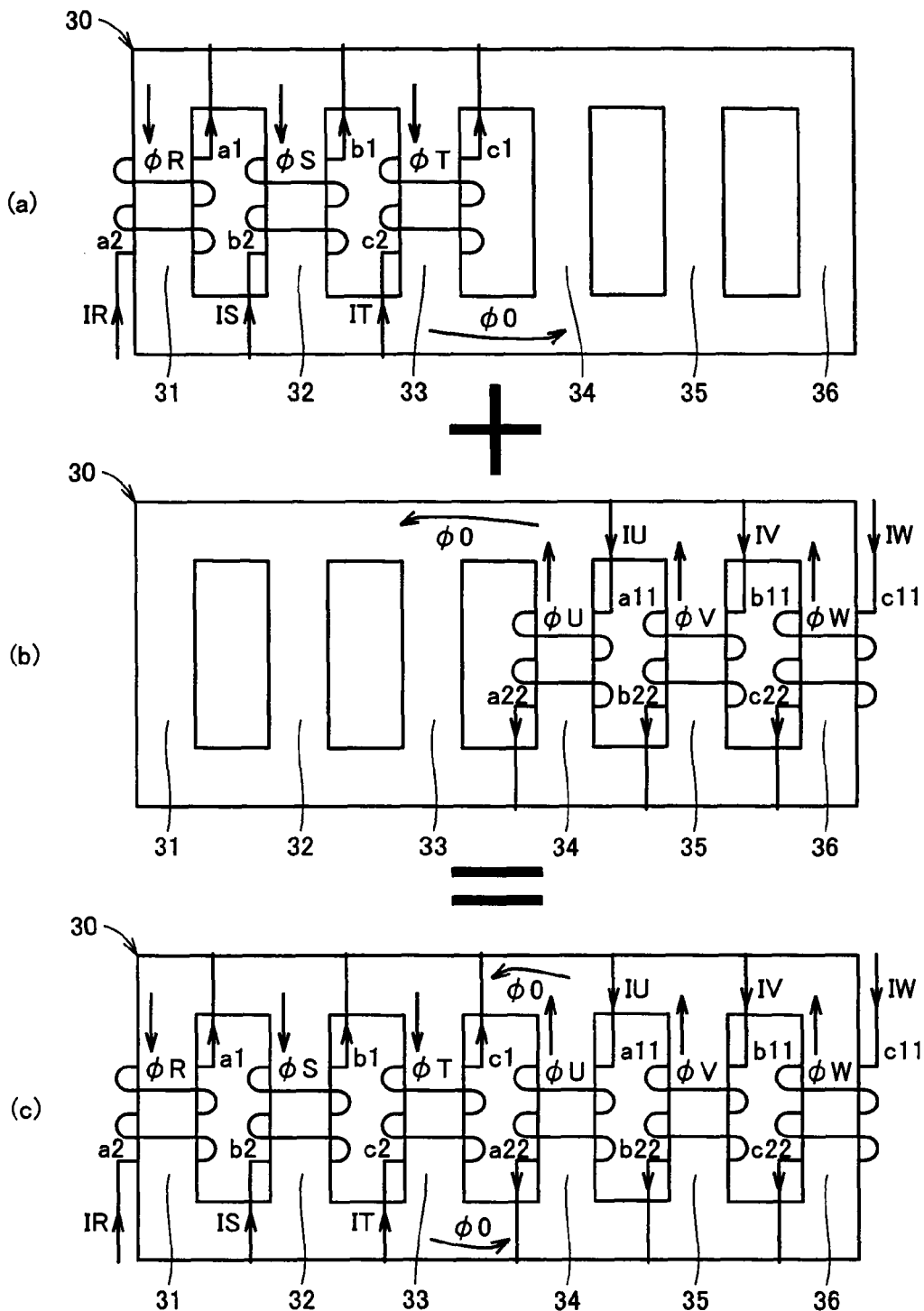
FIG. 5 is a view showing an operation of the six-leg six-phase iron core reactor shown in FIG. 2.

Furthermore, when three-phase currents IR, IS, IT flow through reactors 5 to 7 and three-phase currents IU, IV, IW flow through reactors 16 to 18, and the circulating current shown in FIG. 1 flows as shown in FIG. 5(*c*), magnetic flux $\phi 0$ is generated in main legs 31 to 33 as well as in main legs 34 to 36 due to the circulating current. In this case, since both magnetic flux $\phi 0$ generated in main legs 31 to 33 and magnetic flux $\phi 0$ generated in main legs 34 to 36 are magnetic fluxes due to the circulating current, they have the same magnitude in opposite directions, and cancel each other out. Therefore, the magnetic fluxes are not saturated within main legs 31 to 36. In addition, since no return path leg is required, smaller device dimensions can be achieved when compared with the case of using two four-leg three-phase iron core reactors 54 shown in FIG. 4.

Figure 6:
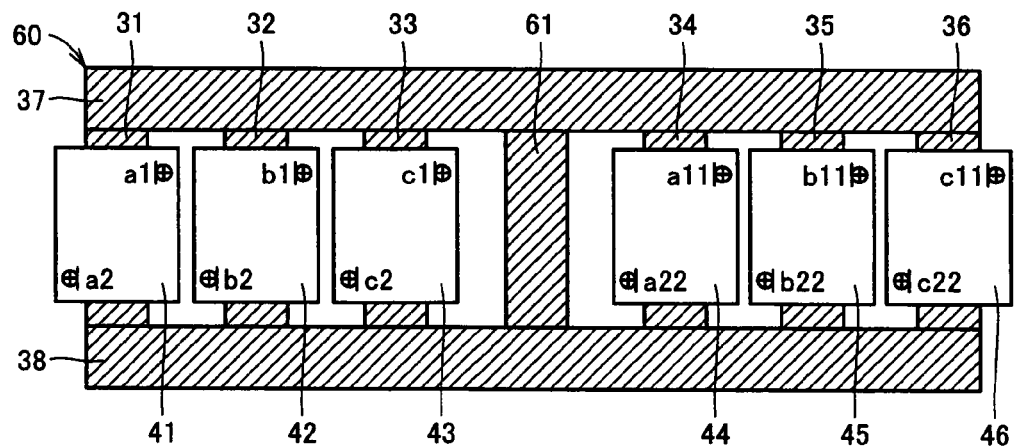
FIG. 6 is a circuit block diagram showing a modification of the embodiment.

FIG. 6 is a view showing a modification of the present embodiment, which is compared with FIG. 2. In FIG. 6, in the modification, reactors 5 to 7, 16 to 18 are composed of one seven-leg six-phase iron core reactor 60. Seven-leg six-phase iron core reactor 60 is configured by adding a return path leg 61 to six-leg six-phase iron core reactor 30 shown in FIG. 2. An upper end portion of return path leg 61 is magnetically coupled to the upper end portions of main legs 31 to 36 by yoke 37, and a lower end portion of return path leg 61 is magnetically coupled to the lower end portions of main legs 31 to 36 by yoke 38. Although return path leg 61 is arranged between main legs 31 to 33 and main legs 34 to 36 in FIG. 7, it may be arranged at another position.

Figure 7:
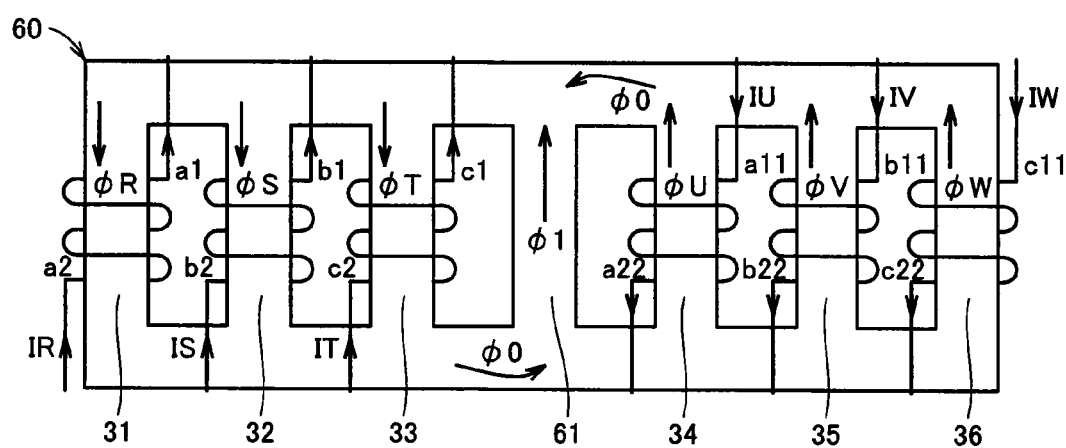
FIG. 7 is a view showing an operation of a seven-leg six-phase iron core reactor shown in FIG. 6.

In the modification, even if a sum I1 of currents flowing through six reactors 5 to 7, 16 to 18 is not zero, by allowing a magnetic flux $\phi 1$ due to current I1 to pass through return path leg 61 as shown in FIG. 7, a loop for magnetic flux $\phi 1$ can be formed, and the magnetic fluxes within main legs 31 to 36 can be prevented from being saturated by magnetic flux $\phi 1$. In addition, since only one return path leg 61 is required, smaller device dimensions can be achieved when compared with the case of using two four-leg three-phase iron core reactors 54 shown in FIG. 4.

Figure 8:
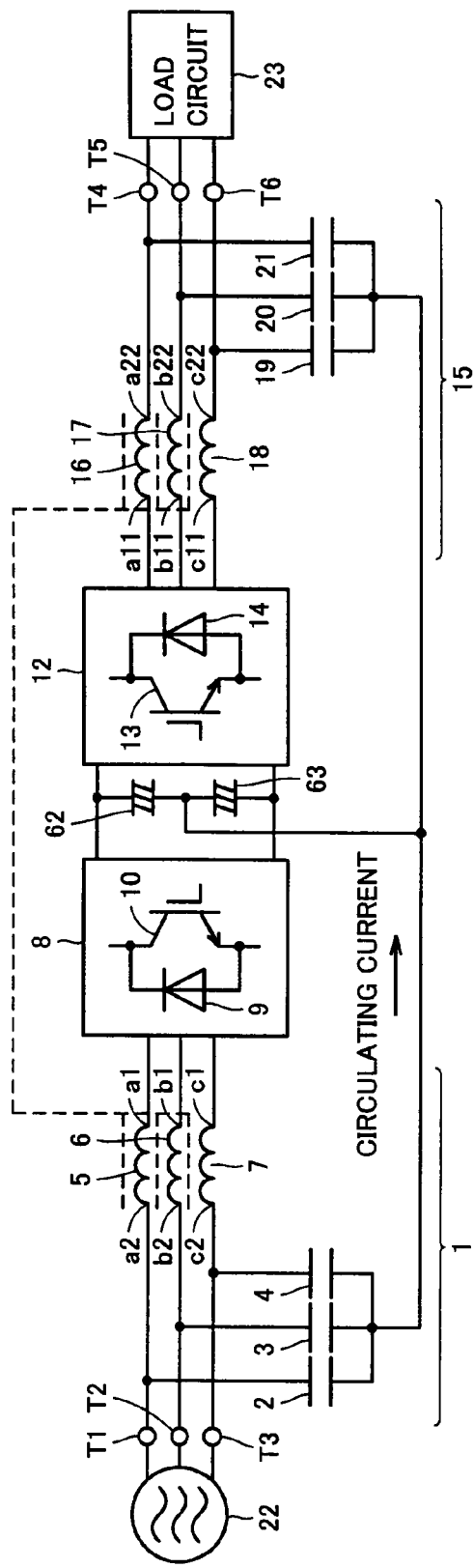
FIG. 8 is a circuit block diagram showing another modification of the embodiment.

FIG. 8 is a circuit block diagram showing a modification of the present embodiment, which is compared with FIG. 1. In FIG. 8, the modification is different from the power conversion device of FIG. 1 in that capacitor 11 is replaced by capacitors 62, 63. Capacitors 62, 63 are connected in series between a pair of output terminals of PWM converter 8, and is charged to the DC voltage. A node between capacitors 62, 63 is connected to the other electrodes of capacitors 2 to 4, 19 to 21. Reactors 5 to 7, 16 to 18 are composed of seven-leg six-phase iron core reactor 60. Also in the modification, an effect identical to that of the embodiment can be achieved.

Figure 9:
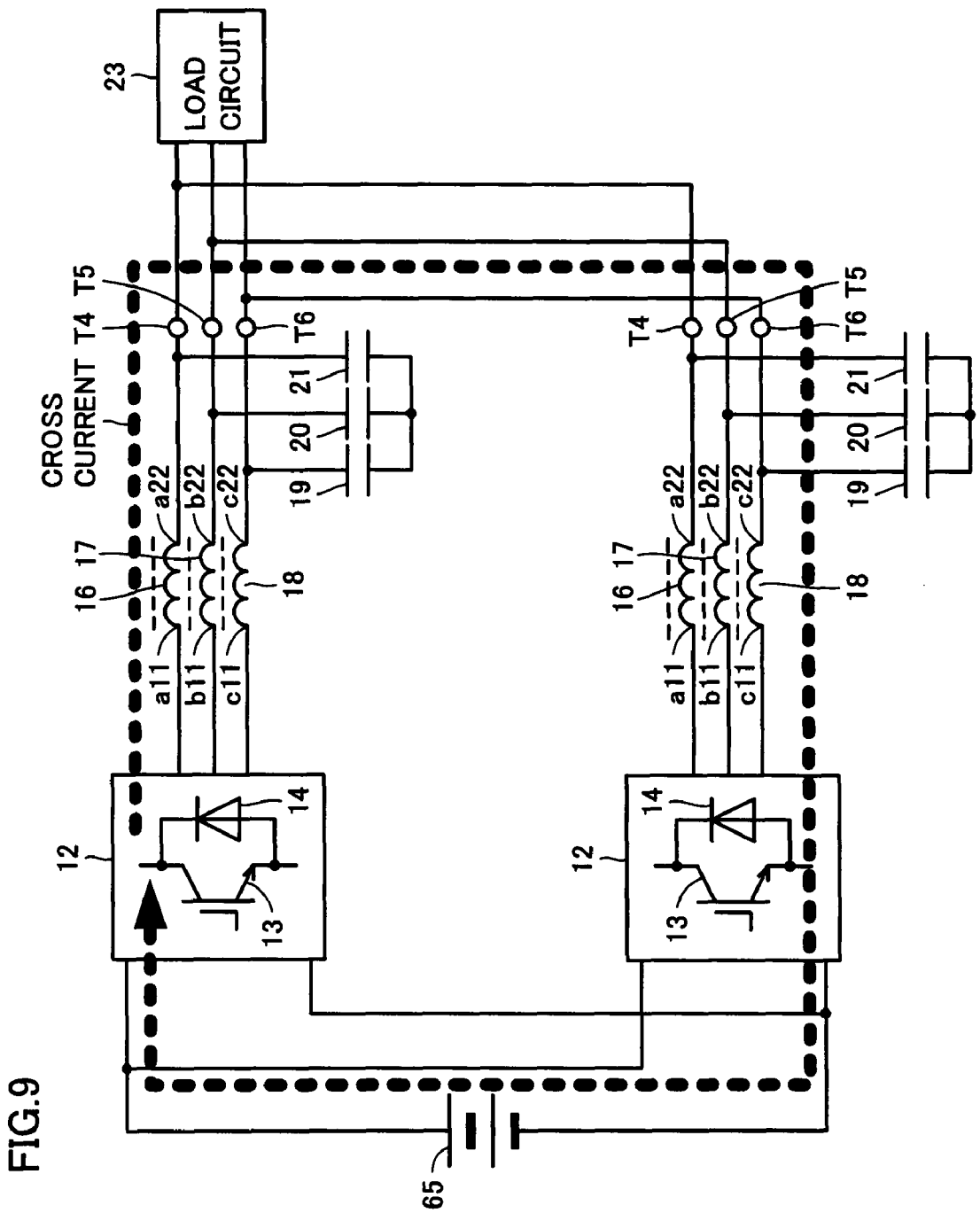
FIG. 9 is a circuit block diagram showing still another modification of the embodiment.

FIG. 9 is a circuit block diagram showing still another modification of the present embodiment. In FIG. 9, the modification is a power conversion system configured by connecting a plurality of (two in FIG. 9) the power conversion devices of FIG. 1 in parallel. In FIG. 9, input terminals T1 to T3, AC input filters 1, PWM converters 8, and capacitors 11 of the plurality of power conversion devices connected in parallel are represented as one DC power source 65. In such a power conversion system, output currents of the plurality of power conversion devices are not necessarily identical, and a current called a cross current flows from one power conversion device to another power conversion device as shown in FIG. 9. The cross current also flows through reactors 5 to 7, 16 to 18 of each power conversion device.

In the power conversion system, reactors 5 to 7, 16 to 18 of each power conversion device are composed of seven-leg six-phase iron core reactor 60. By allowing magnetic flux $\phi 1$ due to the cross current to pass through return path leg 61 as shown in FIG. 7, a loop for magnetic flux $\phi 1$ can be formed, and the magnetic fluxes within main legs 31 to 36 can be prevented from being saturated by magnetic flux $\phi 1$.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

The invention claimed is:

1. A power conversion device, comprising:
a PWM converter converting a first three-phase AC voltage to a DC voltage;
a PWM inverter converting said DC voltage to a second three-phase AC voltage;
an AC input filter transmitting said first three-phase AC voltage and blocking a voltage at a carrier frequency generated in said PWM converter; and
an AC output filter transmitting said second three-phase AC voltage and blocking a voltage at a carrier frequency generated in said PWM inverter,
said AC input filter including
first to third reactors having one terminals receiving said first three-phase AC voltage and other terminals connected to said PWM converter, and
first to third capacitors having one electrodes connected to the one terminals of said first to third reactors, respectively, said AC output filter including
fourth to sixth reactors having one terminals receiving said second three-phase AC voltage and other terminals connected to a load circuit, and
fourth to sixth capacitors having one electrodes connected to the other terminals of said fourth to sixth reactors, respectively, other electrodes of said first to sixth capacitors being connected in common,
said first to sixth reactors being composed of a six-leg six-phase iron core reactor or a seven-leg six-phase iron core reactor.

2. The power conversion device according to claim 1, further comprising a seventh capacitor connected between a pair of output terminals of said PWM converter and charged to said DC voltage.

3. The power conversion device according to claim 1, further comprising seventh and eighth capacitors connected in series between a pair of output terminals of said PWM converter and charged to said DC voltage,
wherein the other electrodes of said first to sixth capacitors are connected to a node between said seventh and eighth capacitors.

* * * * *